United States Patent
Zhao (10) Patent No.: US 11,005,689 B2
(45) Date of Patent: May 11, 2021

(54) METHOD AND APPARATUS FOR BANDWIDTH FILTERING BASED ON DEEP LEARNING, SERVER AND STORAGE MEDIUM

(71) Applicant: Wangsu Science & Technology Co., Ltd., Shanghai (CN)

(72) Inventor: Rui Zhao, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/994,470

(22) Filed: Aug. 14, 2020

(65) Prior Publication Data
US 2021/0014088 A1  Jan. 14, 2021

Related U.S. Application Data

(63) Continuation of application No. PCT/CN2019/102060, filed on Aug. 22, 2019.

(30) Foreign Application Priority Data

Jul. 11, 2019 (CN) .......................... 201910624835.7

(51) Int. Cl.
*H04L 25/03* (2006.01)
*G06K 9/62* (2006.01)
*G06N 3/08* (2006.01)

(52) U.S. Cl.
CPC ...... *H04L 25/03165* (2013.01); *G06K 9/6261* (2013.01); *G06K 9/6262* (2013.01);
(Continued)

(58) Field of Classification Search
CPC ........ H04L 25/03165; H04L 25/03343; G06K 9/6261; G06K 9/6262; G06K 9/6289; G06N 3/084
(Continued)

(56) References Cited

U.S. PATENT DOCUMENTS 10,261,849 B1 * 4/2019 Burke ................. G06F 11/0754
2018/0196891 A1   7/2018 Miao et al.
(Continued)

FOREIGN PATENT DOCUMENTS

CN  101295969 A  10/2008
CN  105471759 A   4/2016
(Continued)

OTHER PUBLICATIONS

Effective Spectral and Excitation Modeling Techniques for LSTM-RNN-Based Speech Synthesis Systems; Song et al. (IEEE/ACM Transactions on Audio, Speech, and Language Processing, vol. 25, No. 11, pp. 2152-2161; Nov. 2017).*
(Continued)

*Primary Examiner* — Hirdepal Singh
(74) *Attorney, Agent, or Firm* — Morgan, Lewis & Bockius LLP (57) ABSTRACT

Embodiments of the present disclosure relate to the field of communication technologies, and provide a method and an apparatus for bandwidth filtering based on deep learning, a server and a storage medium. In the present disclosure, a bandwidth data of a server is obtained in real time (101), the obtained bandwidth data is input into a deep neural network model (102), and an output result of the deep neural network model is taken as filtered output bandwidth data obtained after filtering the input bandwidth data (103), where the deep neural network model is obtained through training according
(Continued)

to historical bandwidth data and output bandwidth data obtained after filtering the historical bandwidth data.

20 Claims, 7 Drawing Sheets

(52) U.S. Cl.
CPC ........... G06K 9/6289 (2013.01); G06N 3/084 (2013.01); H04L 25/03343 (2013.01)

(58) Field of Classification Search
USPC ......................................................... 375/130
See application file for complete search history.

(56) References Cited

U.S. PATENT DOCUMENTS

| | | | | |
|---|---|---|---|---|
| 2019/0182558 A1* | 6/2019 | Stern | ................ | H04N 21/64738 |
| 2019/0325302 A1* | 10/2019 | Savic | .................. | G06F 9/44505 |
| 2019/0325307 A1* | 10/2019 | Li | .............................. | G06N 3/08 |
| 2019/0325860 A1* | 10/2019 | Faubel | .................... | G10L 15/16 |
| 2019/0370644 A1* | 12/2019 | Kenney | ................... | G06F 17/16 |
| 2020/0066296 A1* | 2/2020 | Sargsyan | ............ | G10L 21/0208 |
| 2020/0193275 A1* | 6/2020 | Chen | .................... | G06F 13/4208 |
| 2020/0243102 A1* | 7/2020 | Schmidt | .................. | H04L 65/80 |
| 2020/0322662 A1* | 10/2020 | Korte | ............... | H04N 21/25866 |

FOREIGN PATENT DOCUMENTS

| | | |
|---|---|---|
| CN | 105976020 A | 9/2016 |
| CN | 106712858 A | 5/2017 |
| CN | 108113666 A | 6/2018 |
| CN | 108198571 A | 6/2018 |
| CN | 108449286 A | 8/2018 |
| CN | 109450406 A | 3/2019 |
| CN | 109864713 A | 6/2019 |
| CN | 109977966 A | 7/2019 |
| EP | 1540198 A2 | 6/2005 |

OTHER PUBLICATIONS

International Search Report, PCT/CN2019/102060, dated Aug. 22, 2019, 5 pgs.

Wangsu Science & Technology Co., Ltd., Office Action, CN201910624835.7, dated Nov. 24, 2020, 9 pgs.

* cited by examiner

METHOD AND APPARATUS FOR BANDWIDTH FILTERING BASED ON DEEP LEARNING, SERVER AND STORAGE MEDIUM

CROSS-REFERENCE TO RELATED APPLICATIONS

The present disclosure is a continuation of PCT application No. PCT/CN2019/102060, entitled "METHOD AND APPARATUS FOR BANDWIDTH FILTERING BASED ON DEEP LEARNING, SERVER AND STORAGE MEDIUM," filed Aug. 22, 2019, which claims priority to Chinese Patent Application No. 201910624835.7, entitled "METHOD AND APPARATUS FOR BANDWIDTH FILTERING BASED ON DEEP LEARNING, SERVER AND STORAGE MEDIUM," filed Jul. 11, 2019, each of which is incorporated herein by reference in its entirety.

TECHNICAL FIELD

Embodiments of the present disclosure relate to the field of communication technologies, and in particular, to a method and an apparatus for bandwidth filtering based on deep learning, a server and a storage medium.

BACKGROUND

A network service provider can transmit data with a consumer, and a bandwidth is used to identify a data transmission capability of signal transmission, that is, a data volume passing through a link per unit of time. A smaller change of the bandwidth over time indicates more stable data transmission and higher quality of service provided by the service provider. To ensure a high quality service, it is necessary to monitor the bandwidth of a server, formulate a relevant rate-limiting policy according to a real-time bandwidth of the server, and detect whether bandwidth data is abnormal. When the bandwidth data fluctuates or real-time bandwidth data is detected to be missing, the detected bandwidth data is filtered and the filtered bandwidth data is taken as an input of a subsequent relevant application.

At least the following problems in the relevant art are found: since bandwidth fluctuation situations on different servers are different, if a single filtering algorithm is selected to filter bandwidths of the different servers with a same parameter, the filtering effect is relatively poor; and if different parameters or a plurality of filtering algorithms are adopted to filter bandwidths of the different servers, manual attempts need be made on the different parameters or the different filtering algorithms to determine an appropriate filtering method for bandwidth data of each type of server. Due to the large quantity of online servers, such manual attempts need to consume a large quantity of energy and time.

SUMMARY

Embodiments of the present disclosure are intended to provide a method and an apparatus for bandwidth filtering based on deep learning, a server and a storage medium, to implement real-time filtering on bandwidth data of a server by using a deep neural network model, which has a good filtering effect on the bandwidth data of the server, thereby reducing consumption of manpower, and saving time and energy.

To overcome the foregoing technical problems, an embodiment of the present disclosure provides a method for bandwidth filtering based on deep learning, including: obtaining initial bandwidth data of a server in real time; inputting the initial bandwidth data into a deep neural network model, where the deep neural network model is obtained through training according to historical bandwidth data and output bandwidth data obtained after filtering the historical bandwidth data; and taking an output result of the deep neural network model as filtered output bandwidth data.

An embodiment of the present disclosure further provides an apparatus for bandwidth filtering based on deep learning, including: an obtaining module, an input module, and a filtering module, where the obtaining module is configured to obtain initial bandwidth data of a server in real time; the input module is configured to input the initial bandwidth data into a deep neural network model, where the deep neural network model is obtained through training according to historical bandwidth data and output bandwidth data obtained after filtering the historical bandwidth data; and the filtering module is configured to take an output result of the deep neural network model as filtered output bandwidth data.

An embodiment of the present disclosure further provides a server, including: at least one processor, and, a memory communicably connected with the at least one processor; the memory stores an instruction executable by the at least one processor, and the instruction, when executed by the at least one processor, causes the at least one processor to perform the foregoing method for bandwidth filtering based on deep learning.

An embodiment of the present disclosure further provides a computer readable storage medium storing a computer program, where the computer program, when executed by the processor, implements the foregoing method for bandwidth filtering based on deep learning.

Compared with the existing technology, in the embodiments of the present disclosure, a bandwidth data of a server is obtained in real time, and the obtained bandwidth data is input into a deep neural network model, where an output result of the deep neural network model is output bandwidth data obtained after filtering the input bandwidth data, and the deep neural network model is obtained through training according to historical bandwidth data and output bandwidth data obtained after filtering the historical bandwidth data. Online real-time filtering can be performed by using the deep neural network model, and learning can be made according to real-time changes of online bandwidth data, so that investment of a large quantity of manpower can be avoided, and consumption of time and energy can be reduced, thereby reducing a latency caused by filtering. On the other hand, when the deep neural network model is trained to have good accuracy, the trained deep neural network model may be deployed online for real-time filtering, which has a good filtering effect on the bandwidth data of the server.

In addition, the step of obtaining the output bandwidth data after filtering the historical bandwidth data specifically includes: filtering the historical bandwidth data by using at least two low-pass filtering algorithms to obtain filtering results of all low-pass filtering algorithms; and performing a secondary processing on the filtering results of all the low-pass filtering algorithms to obtain the output bandwidth data. In this way, the trained deep neural network model can achieve better filtering effect, and the filtered output bandwidth data can not only have a good smoothing effect, but also retain mutation characteristics required by a service scenario. When the online real-time filtering is made by the trained deep neural network model, a good filtering effect is achieved for each of fluctuation types of bandwidths of different servers.

In addition, the step of performing a secondary processing on the filtering results of all the low-pass filtering algorithms specifically includes: presetting proportionality coefficients corresponding to the filtering results of all the filtering algorithms; and fusing the filtering results of all the low-pass filtering algorithms according to the proportionality coefficients. Different filtering effects can be produced by setting different proportionality coefficients, and filtering effects of bandwidths can be adjusted according to different requirements.

In addition, a method for training the deep neural network model includes: over-sampling the historical bandwidth data and the output bandwidth data obtained after filtering the historical bandwidth data; and training the deep neural network model according to the over-sampled data. Since the data obtained by filtering the bandwidth data is less, the historical bandwidth data and the filtered output bandwidth data can be augmented by over-sampling, so that sample data used to train the deep neural network model is richer. In this way, the trained model is more accurate, which can achieve a better filtering effect and avoid problems of a poor model training effect caused by fewer data samples or unbalanced data samples.

In addition, the step of over-sampling the historical bandwidth data and the output bandwidth data obtained after filtering the historical bandwidth data is specifically implemented by over-sampling the historical bandwidth data and the output bandwidth data obtained after filtering the historical bandwidth data by using an SMOTE algorithm. In this way, a bandwidth value obtained by sampling is closer to real-time bandwidth data or the filtered output bandwidth data, and there is no repetition between the over-sampled bandwidth value and the original data. The historical bandwidth data and the filtered output bandwidth data used to train the deep neural network model are richer, thereby improving the effectiveness of the bandwidth data.

In addition, after obtaining the historical bandwidth data, the method further includes: pre-processing the obtained historical bandwidth data, where the pre-processing at least includes: interpolation processing or normalization processing; the output bandwidth data obtained after filtering the historical bandwidth data is specifically: the output bandwidth data obtained after filtering the pre-processed historical bandwidth data. In this way, missing data of the historical bandwidth data can be filled to ensure the integrity of the historical bandwidth data and avoid the impact of the missing data on the accuracy of the model training; and pre-processing the historical bandwidth data can also enable the deep neural network model to converge quickly in the training process and reduce the time required for the training.

In addition, after the deep neural network model is trained, the method further includes: validating a fitting effect of the trained deep neural network model; and storing the deep neural network model when the fitting effect meets a preset requirement, where the deep neural network model is specifically the stored deep neural network model. In this way, the fitting effect of the deep neural network model can be validated, and when the fitting effect meets the requirement, the model is applied to an online filtering scenario to ensure the filtering effect of the online real-time filtering.

BRIEF DESCRIPTION OF THE DRAWINGS

One or more embodiments are exemplarily illustrated with reference to corresponding accompanying drawings, which do not constitute a limitation on the embodiments. Unless otherwise stated, the accompanying drawings do not constitute a limitation on proportions.

DETAILED DESCRIPTION

To make the objectives, technical solutions, and advantages of embodiments of the present disclosure clearer, the following further describes the embodiments of the present disclosure in detail with reference to the accompanying drawings. However, a person of ordinary skill in the art may understand, in each embodiment of the present disclosure, a plurality of technical details are presented to enable readers to better understand the present disclosure. However, even without these technical details and variations and modifications based on the following embodiments, the technical solution to be protected under the present disclosure can also be implemented.

The following embodiments are divided for the convenience of description and shall not constitute any limitations on the specific implementations. The embodiments may be combined with and quoted from each other under the premise of no contradiction.

Figure 1:
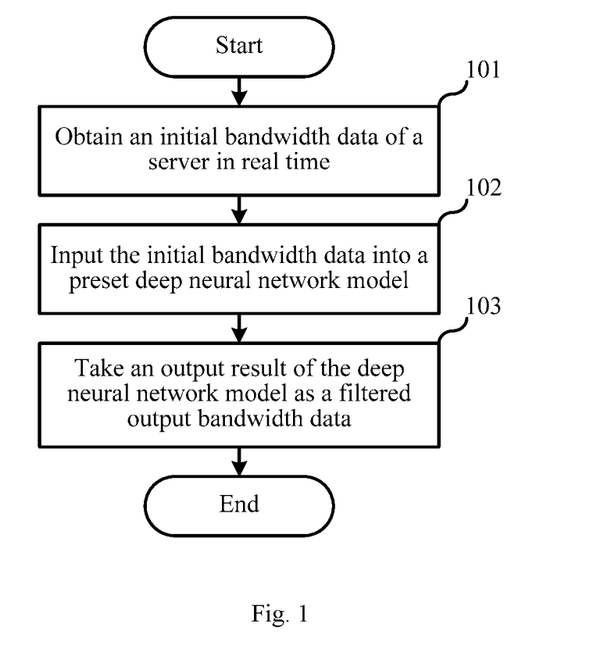
FIG. 1 is a flowchart of a method for bandwidth filtering based on deep learning according to a first embodiment of the present disclosure.

A first embodiment of the present disclosure relates to a method for bandwidth filtering based on deep learning. In this embodiment, initial bandwidth data of a server is obtained in real time; the initial bandwidth data is input into a deep neural network model, where the deep neural network model is obtained through training according to historical bandwidth data and output bandwidth data obtained after filtering the historical bandwidth data; and an output result of the deep neural network model is taken as the filtered output bandwidth data. Real-time filtering can be implemented on the bandwidth data of the server by using the preset deep neural network model, which has a good filtering effect on the bandwidth data of the server, thereby reducing consumption of manpower, saving time and energy and reducing a latency caused by filtering. The following is a detailed description of implementation details of the method for bandwidth filtering based on deep learning of this embodiment, and the following content is only implementation details provided for the convenience of understanding and is not necessary for the implementation of this solution. The specific process is shown in FIG. 1.

Step 101, obtain initial bandwidth data of a server in real time. Specifically, the initial bandwidth data of the server may be obtained by the server itself, or by a node server, or by a layer of intelligent virtual network (CDN) constituted by node servers placed throughout the network between a service provider and a consumer. A CDN system may monitor a bandwidth of a server, formulate a rate-limiting policy according to a real-time bandwidth, and evaluate quality of the server or detect whether the bandwidth is abnormal. The bandwidth data may be filtered by using the CDN system, and the bandwidth data of the server may be obtained in real time in the monitoring process, so that there is no need to newly add node servers and other devices for filtering in the network, thereby saving the cost.

Figure 2:
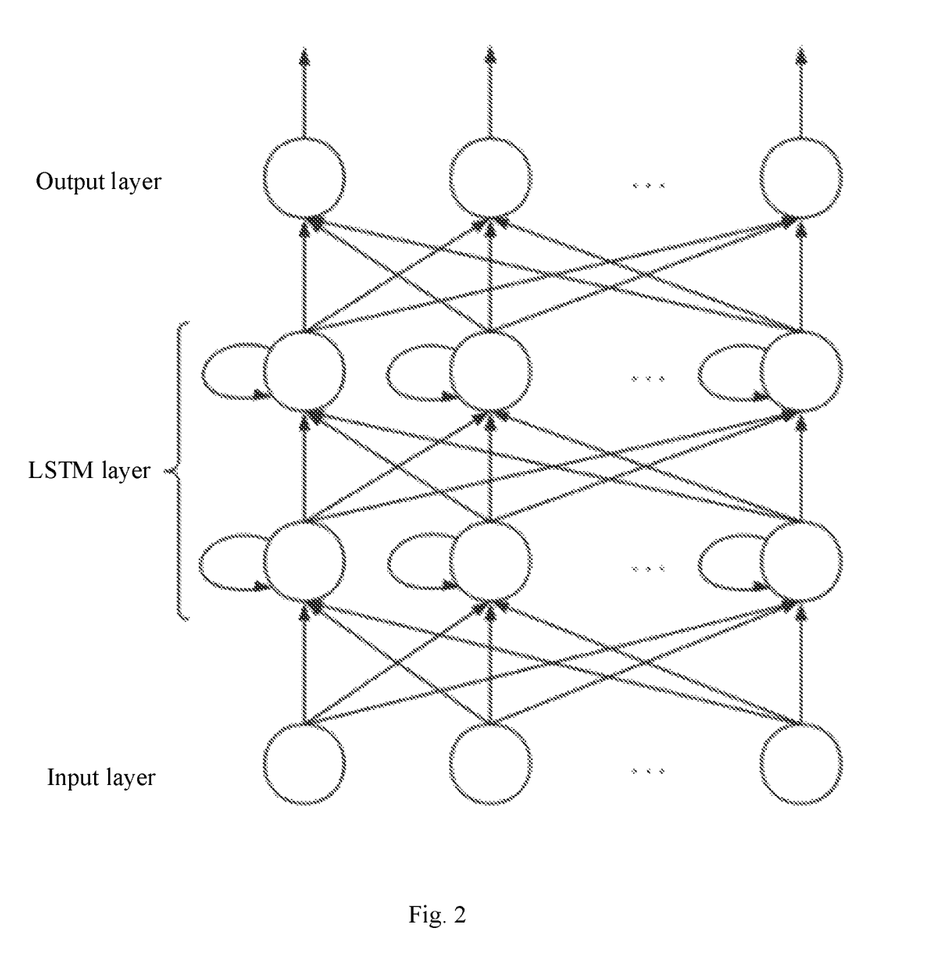
FIG. 2 is a schematic structural diagram of a deep neural network model according to the first embodiment of the present disclosure.
Figure 3:
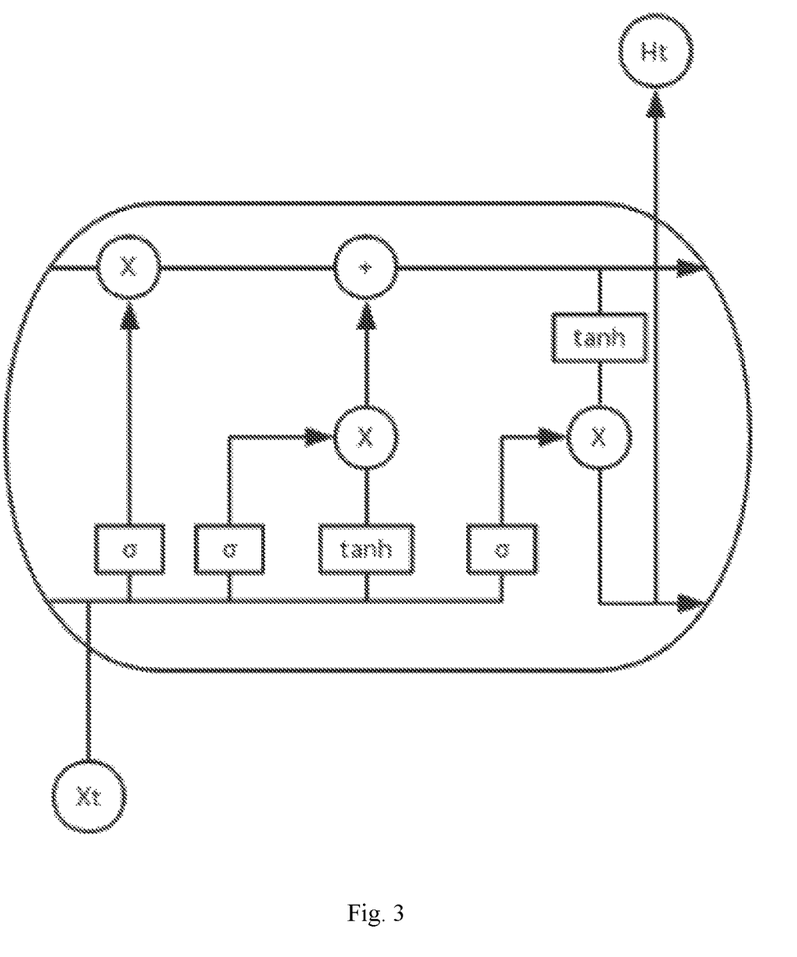
FIG. 3 is a schematic structural diagram of a cell of a deep neural network model according to the first embodiment of the present disclosure.

Step 102, input the initial bandwidth data into a deep neural network model. Specifically, the deep neural network model is obtained through training according to historical bandwidth data and output bandwidth data obtained after filtering the historical bandwidth data, and is used to obtain the filtered output bandwidth data according to the input initial bandwidth data. The structure of the deep neural network model is shown in FIG. 2, and the deep neural network model mainly includes an input layer, an LSTM layer, and an output layer. The input layer is used to receive the historical bandwidth data. The output layer is used to output fitted data, where the output fitted data has a same sequence length as that of the input historical bandwidth data. The LSTM layer is a long short-term memory network that may process bandwidth data of a relatively long time sequence. The LSTM layer includes a plurality of cells. A specific structure of each cell is shown in FIG. 3, where Xt represents input data of the cell, and Ht represents output data of the cell. Compared with a Recurrent Neural Network (RNN), the LSTM layer additionally includes an input gate, a forget gate, and an output gate. The input gate is used to determine input information in the cell. The forget gate is used to discard information in the cell that has no impact on an output result. The output gate is used to determine output information in the cell. To ensure the accuracy of the trained deep neural network model and reduce the time required for the training, the quantity of LSTM layers may be set to 2, and the quantity of cells may be set to 50 in practical application.

Step 103, take the output result of the deep neural network model as a filtered output bandwidth data. Specifically, the deep neural network model fits the filtered output bandwidth data according to the input bandwidth data, and takes the fitted data as the output bandwidth data obtained after filtering the input bandwidth data. Real-time filtering may be implemented by using the preset deep neural network model, thereby reducing consumption of manpower. Compared with manually attempting different parameters for filtering, using the model for real-time filtering saves a large quantity of time, improves the efficiency of filtering, and reduces a latency caused by filtering. In addition, after obtaining the output result, the deep neural network model can also learn according to the input real-time bandwidth data and the output result, so that the model can be updated in real time, and the accuracy of the deep neural network model can be continuously improved.

Compared with the existing technology, in the embodiment of the present disclosure, a bandwidth data of a server is obtained in real time, and the obtained bandwidth data is input into a deep neural network model, where an output result of the deep neural network model is output bandwidth data obtained after filtering the input bandwidth data, and the deep neural network model is obtained through training according to historical bandwidth data and the output bandwidth data obtained after filtering the historical bandwidth data. Online real-time filtering can be performed by using the preset deep neural network model, and learning can be made according to real-time changes of online bandwidth data, so that investment of a large quantity of manpower can be avoided, and consumption of time and energy can be reduced, thereby reducing a latency caused by filtering. On the other hand, when the deep neural network model is trained to have good accuracy, the trained deep neural network model may be deployed online for real-time filtering, which has a good filtering effect on the bandwidth data of the server.

Figure 4:
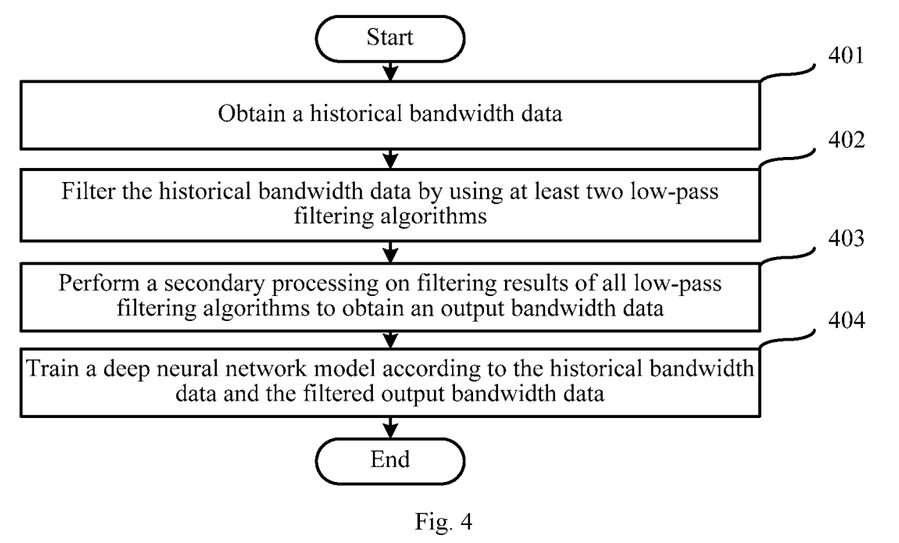
FIG. 4 is a flowchart of training a deep neural network model according to a second embodiment of the present disclosure.

A second embodiment of the present disclosure relates to a method for bandwidth filtering based on deep learning. The process of obtaining a trained deep neural network model is specifically illustrated in the second embodiment of the present disclosure. On the basis of the first embodiment, the specific implementation of obtaining output bandwidth data after filtering historical bandwidth data is specifically illustrated. The process of obtaining the deep neural network model through training according to the historical bandwidth data and the output bandwidth data obtained after filtering the historical bandwidth data is shown in FIG. 4.

Step 401, obtain a historical bandwidth data. Specifically, bandwidth data of a server is obtained from a data storage platform at a fixed frequency. The obtained bandwidth data may be bandwidth data of different servers, which enriches data of sample set for training a model, and therefore enables the trained deep neural network model to have a good filtering effect on each of fluctuation types of bandwidths of different servers. The frequency of collecting the bandwidth data may be 1 minute, that is, one bandwidth data point is collected every minute, and the bandwidth data of a period of time is collected at a fixed frequency. For example, the bandwidth data for the past month or half of the month is obtained at a collecting frequency of one minute. The historical bandwidth data obtained in this case is time sequence data, which may be used to reflect the situation in which a phenomenon changes with time. Training the deep neural network model with the bandwidth data of the time sequence may automatically learn of the self-correlation characteristic of the bandwidth data on the time sequence, and when the deep neural network model is terminated in training and deployed online for real-time filtering, the model may be applied to different servers to smooth the bandwidth data by using the mutual dependency relationship in the time sequence.

Step 402, filter the historical bandwidth data by using at least two low-pass filtering algorithms. Specifically, low-pass filtering algorithms are selected according to filtering effects, so that a good filtering effect is achieved for each of fluctuation types of bandwidths of different servers. For the convenience of understanding the process of filtering, two different low-pass filtering algorithms are taken as examples below to specifically illustrate the process of filtering the historical bandwidth data. However, the present disclosure is not limited to the following two filtering algorithms.

The Kalman filtering algorithm filters the historical bandwidth data in time domain space. Parameters (different parameters may be used to filter different machine bandwidths) are debugged according to historical data and human experience, a process model of a system is then used to calculate a current bandwidth based on a bandwidth of a previous period and a Kalman gain of the system, and finally the Kalman gain for calculation of a next period is updated. After processing of the filtering algorithm, a relatively ideal result may be achieved, that is, small spikes may be smoothed, and a quick response may be made to a sharp increase or decrease of a relatively large amplitude to complete the filtering.

The Butterworth filtering algorithm uses a Butterworth low-pass filter, which is characterized in that a frequency response curve within a pass band is maintained as flat as possible without fluctuation, while the frequency response curve gradually drops to zero in a group band. Like the Kalman filtering method, the Butterworth filter is used to debug parameters according to human experience, and filter an original bandwidth to achieve a relatively ideal result.

Step 403, perform a secondary processing on the filtering results of all the low-pass filtering algorithms to obtain output bandwidth data. In practical application, the secondary processing may be fusion processing. Proportionality coefficients corresponding to the filtering results of all the filtering algorithms are preset, and the filtering results of all the low-pass filtering algorithms are fused according to the proportionality coefficients. Different filtering effects can be produced by setting different proportionality coefficients, and filtering effects of bandwidths can be adjusted according to different requirements.

Taking the foregoing two filtering algorithms as examples, fusing the filtering results according to the proportionality coefficients is illustrated specifically:

First, a filtering result of the Kalman filtering algorithm is obtained, and Kal(t) is used to represent a Kalman filtering result at a moment t. Next, a filtering result of the Butterworth filtering algorithm is obtained, and Bt(t) is used to represent a Butterworth filtering result at the moment t. Assuming that a preset proportionality coefficient corresponding to the filtering result of the Kalman filtering algorithm is α, α□[0, 1], a proportionality coefficient corresponding to the filtering result of the Butterworth filtering algorithm is (1−α), the filtering results of all the low-pass filtering algorithms are fused according to the proportionality coefficients, and a fusion result is f(t)=α*Kal(t)+(1−α)*Bt(t).

The foregoing is only a specific implementation of the secondary processing, that is, a specific implementation of fusing the filtering results of all the low-pass filtering algorithms. In practical application, a secondary processing may also be performed on the filtering results of all the low-pass filtering algorithms by using another calculation method other than fusion. For example, the output bandwidth data is obtained by adding the filtering results of all the low-pass filtering algorithms; or the output bandwidth data is obtained by adding an excitation function to the filtering results of all the low-pass filtering algorithms and then adding or fusing them, or by first adding or fusing the filtering results of all the low-pass filtering algorithms and then adding an excitation function to a result of the addition or fusion. In this way, non-linear factors can be introduced by the excitation function to make the model more expressive. The specific processing manner of the secondary processing is not limited herein.

Step 404, train the deep neural network model according to the historical bandwidth data and the output bandwidth data. Specifically, the obtained historical bandwidth data is divided according to a preset time step parameter. Assuming that the preset time step parameter is 10 minutes, the historical bandwidth data is divided into a plurality of pieces of input data in a unit of 10 minutes. The input data obtained through division is input into the deep neural network model, the deep neural network model determines output data by using an LSTM (long short-term memory network), and the obtained output data has a same time sequence length as that of the input data. After the output data is obtained, an error between the output data and the output bandwidth data obtained after filtering the historical bandwidth data obtained in advance is calculated, and parameters in the network are updated continuously according to a back propagation algorithm. After a finite quantity of iterations, the trained deep neural network model and the parameters of the model are output.

After the trained deep neural network model and the parameters of the model are output, the output model and the parameters of the model may be further validated, which is specifically as follows:

After the historical bandwidth data and the output bandwidth data are obtained, the obtained historical bandwidth data and the output bandwidth data are divided according to a preset duration. The divided bandwidth data is taken as a sample set. The sample set is divided into a training set and a validation set according to a preset proportion. The training set is used to train the deep neural network model, and the validation set is used to validate the trained deep neural network model. A fitting effect of the trained deep neural network model is validated according to the validation set that is obtained through division in advance. Specifically, the output data and filtering data obtained after real filtering may be compared by using a mean square error (MSE) or a root mean square error (RMSE). If an error between the output data and the data obtained after real filtering is within a preset threshold, it indicates that the fitting effect meets a requirement, and the trained deep neural network model may be deployed online for real-time filtering.

A method of using the trained deep neural network model for real-time filtering is consistent with steps 101 to 103 in the first embodiment, that is, the bandwidth data of the server is obtained in real time, the bandwidth data is taken as initial bandwidth data and input into the deep neural network model trained in advance, and the output result of the deep neural network model is taken as the filtered output bandwidth data. Details are not described herein again.

In this embodiment, the historical bandwidth data is filtered by using at least two low-pass filtering algorithms to obtain the filtering results of all the low-pass filtering algorithms; and a secondary processing is performed on the filtering results of all the low-pass filtering algorithms to obtain the output bandwidth data after filtering the historical bandwidth data. In this way, the trained deep neural network model can better adapt to fluctuation types of bandwidths of different servers, and when the online real-time filtering is made by the trained deep neural network model, a good filtering effect is similarly achieved for fluctuation types of bandwidths of different servers.

A third embodiment of the present disclosure relates to a method for bandwidth filtering based on deep learning. In the third embodiment of the present disclosure, historical bandwidth data and output bandwidth data obtained after filtering the historical bandwidth data are over-sampled, which is specifically shown in FIG. 5.

Figure 5:
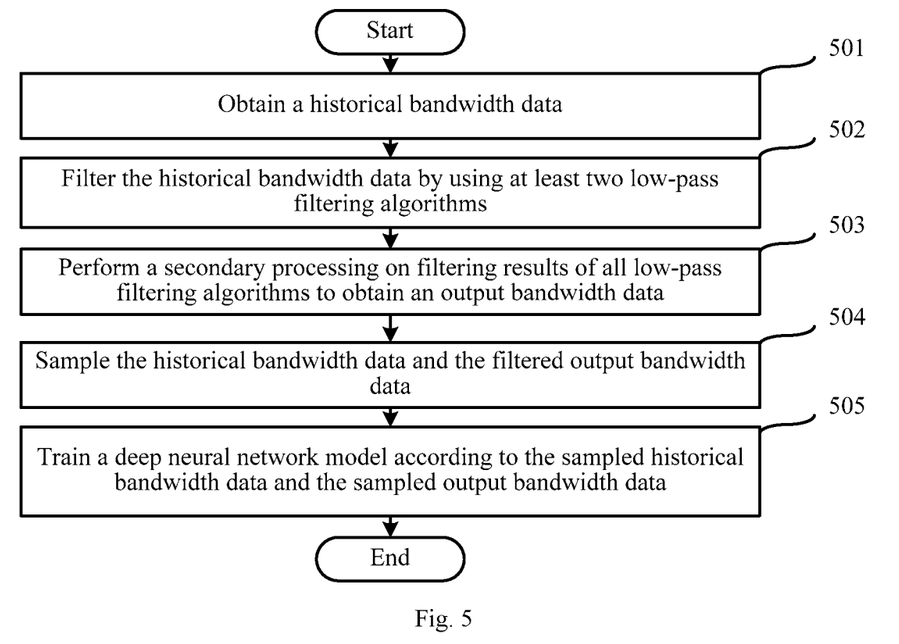
FIG. 5 is a flowchart of training a deep neural network model according to a third embodiment of the present disclosure.

Step 501, obtain a historical bandwidth data.

Step 502, filter the historical bandwidth data by using at least two low-pass filtering algorithms.

Step 503, perform a secondary processing on filtering results of all low-pass filtering algorithms to obtain filtered output bandwidth data.

Steps 501 to 503 are consistent with steps 401 to 403 in the second embodiment, and details are not described herein again.

Step 504, over-sample the historical bandwidth data and the filtered output bandwidth data. Specifically, the historical bandwidth data and the filtered output bandwidth data may be over-sampled by using a Synthetic Minority Oversampling Technique (SMOTE) algorithm. In this way, a data volume of the historical bandwidth data and the filtered output bandwidth data may be enriched, and the problem of less output bandwidth data processed by a filtering algorithm may be solved. When the historical bandwidth data is filtered by using a low-pass filtering algorithm, parameters need to be debugged according to human experience. However, it takes a large quantity of time to set the filter parameters manually, and a relatively large quantity of bandwidth data cannot be processed. Consequently, the output bandwidth data after processed by the filtering algorithm is less. In particular, when there is a sharp increase or decrease of a relatively large amplitude in the historical bandwidth data, a sample size of the filtered output bandwidth data is even reduced. Over-sampling the historical bandwidth data and the filtered output bandwidth data by using the SMOTE algorithm or other algorithms can increase the sample size of the historical bandwidth data and the filtered output bandwidth data, and a deep neural network model trained with a large quantity of sample data has higher accuracy.

The process of over-sampling the historical bandwidth data and the filtered output bandwidth data by using the SMOTE algorithm specifically includes: selecting each moment point of the historical bandwidth data or the filtered output bandwidth data in order; determining whether the selected moment point is a first moment point of the historical bandwidth data or the filtered output bandwidth data; if the selected moment point is the first moment point, determining an over-sampled bandwidth value of the selected moment point according to a bandwidth value of the first moment point and a bandwidth value of a next moment point of the first moment point; if the selected moment point is not the first moment point, determining whether a difference between the bandwidth value of the selected moment point and a bandwidth value of a previous moment point of the selected moment point is greater than a preset threshold; if the difference is greater than the preset threshold, determining an over-sampled bandwidth value of the selected moment point according to the bandwidth value of the selected moment point and the bandwidth value of the next moment point of the selected moment point; if the difference is less than or equal to the preset threshold, determining an over-sampled bandwidth value of the selected moment point according to the bandwidth value of the selected moment point and the bandwidth value of the previous moment point of the selected moment point; and storing the determined over-sampled bandwidth value.

The following specifically illustrates a code of the SMOTE algorithm:

First, an appropriate threshold $\varphi$ is initialized, where the threshold $\varphi$ is used to simply divide an amplitude of a sharp increase or decrease of the over-sampled bandwidth data. Next, an array r is created, where the array r is used to store the over-sampled data. Bandwidth data that needs to be over-sampled is input. Starting from a first moment point of the bandwidth data, moment points are selected in order to make the following judgment: if the selected moment point is the first moment point of the bandwidth data being processed, or a difference between a bandwidth of the selected moment point and a bandwidth of a previous moment point is greater than the threshold $\varphi$, a value is randomly selected between a bandwidth value of the selected moment point and a bandwidth value of a next moment point as an over-sampled bandwidth value of the selected moment point. For a case other than the foregoing cases, a value is randomly selected between the bandwidth value of the selected moment point and a bandwidth value of the previous moment point as the over-sampled bandwidth value of the selected moment point. For example, an existing set of bandwidth data is as follows: 688 kb/s, 651 kb/s, 719 kb/s, 649 kb/s, 606 kb/s, . . . , the threshold $\varphi$ is set to 50, and the first moment point is selected for judgment. It can be known according to the foregoing discussion that, when the selected moment point is the first moment point, the over-sampled bandwidth value is randomly selected between the bandwidth value of the selected moment point and the bandwidth value of the next moment point, that is, between 688 kb/s and 651 kb/s, and it is assumed that an over-sampled bandwidth value of the first moment point that is randomly selected is 659 kb/s. After the over-sampled bandwidth value of the first moment point is determined, a second moment point is selected for the foregoing judgment. It can be known according to the foregoing bandwidth data that, a difference between a bandwidth value of the second moment point and a bandwidth value of a previous moment point is less than the threshold (688-651=37<50), and the over-sampled bandwidth value is randomly selected between the bandwidth value of the selected moment point and the bandwidth value of the previous moment point, that is, between 651 kb/s and 688 kb/s, and it is assumed that an over-sampled bandwidth value of the second moment point that is randomly selected is 672 kb/s. A difference between a bandwidth value of a third moment point and a bandwidth value of a previous moment point is greater than the threshold (719−651=68>50), a value is randomly selected between a bandwidth value of a current moment point and a bandwidth value of a next moment point as the over-sampled bandwidth value, and it is assumed that 708 kb/s is randomly selected as the over-sampled bandwidth value of the third moment point, over-sampled bandwidth values of the following moment points are similarly selected as above, and details are not described herein again. Over-sampled bandwidth values 659 kb/s, 672 kb/s, 708 kb/s, 632 kb/s, 628 kb/s, . . . of all moment points are obtained, and over-sampling of the bandwidth data is completed.

Step 505, train a deep neural network model according to the over-sampled historical bandwidth data and the over-sampled filtered output bandwidth data.

After the deep neural network model is trained according to over-sampled historical bandwidth data and the filtered output bandwidth data, the trained deep neural network model is deployed online for real-time filtering, a method for using the trained deep neural network model for real-time filtering is consistent with steps 101 to 103 in the first embodiment, that is, the bandwidth data of the server is obtained in real time, the bandwidth data is input into the deep neural network model trained in advance, and the output result of the deep neural network model is taken as the filtered output bandwidth data. Details are not described herein again.

In this embodiment, since data obtained by filtering the bandwidth data is less, the historical bandwidth data and the filtered output bandwidth data may be augmented by over-sampling, so that sample data used to train the deep neural network model is richer, which can achieve a better filtering effect.

A fourth embodiment of the present disclosure relates to a method for bandwidth filtering based on deep learning. In the fourth embodiment of the present disclosure, the obtained historical bandwidth data is pre-processed, which is specifically shown in FIG. 6.

Figure 6:
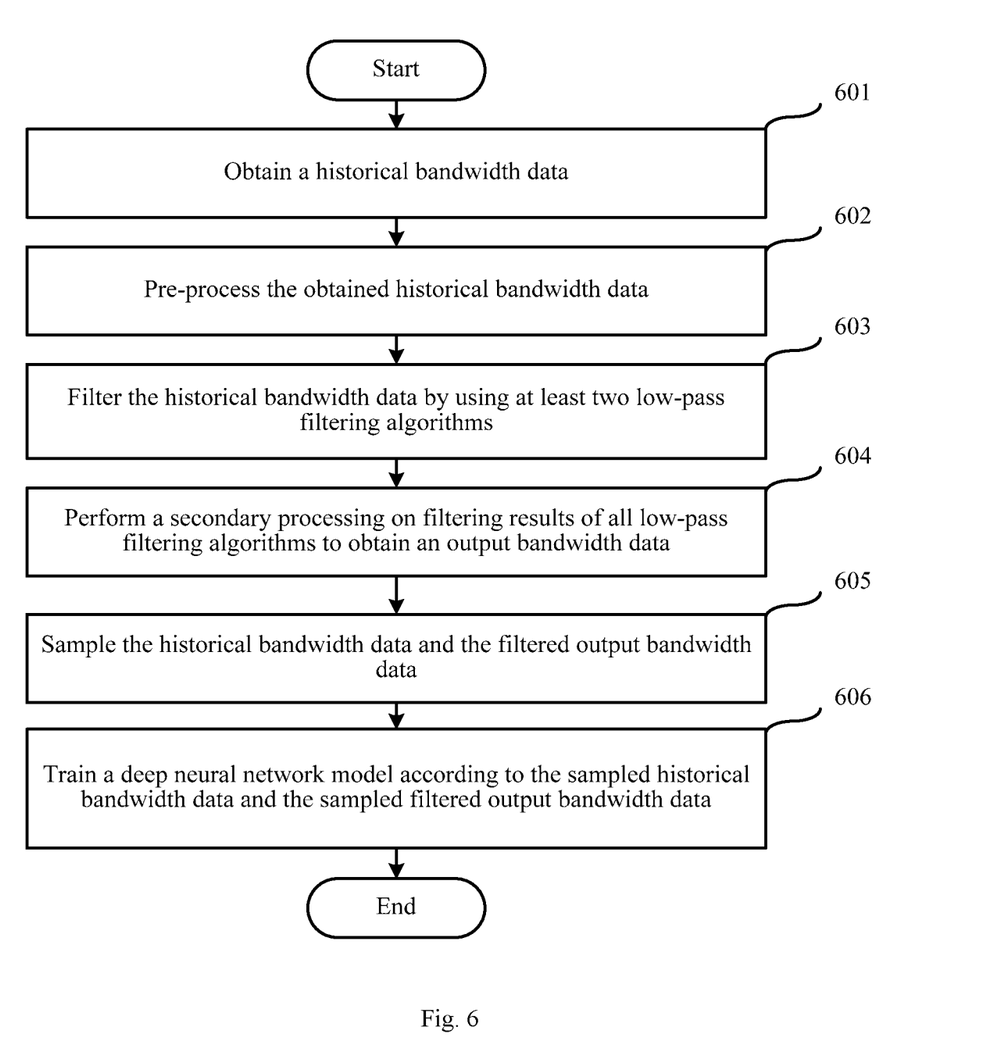
FIG. 6 is a flowchart of training a deep neural network model according to a fourth embodiment of the present disclosure.

Step 601, obtain the historical bandwidth data.

Step 602, pre-process the obtained historical bandwidth data. Specifically, interpolation processing is performed on missing data in the obtained historical bandwidth data or normalization processing is performed on the bandwidth data. When the missing data and an extreme abnormal value occur in the obtained data, the extreme abnormal value is specifically a bandwidth value of 0 or a maximum value of type int. To avoid the impact of the missing data or extreme abnormal data on the accuracy of model training, a simple linear interpolation method is adopted to fill the missing data or replace the extreme abnormal data. The interpolation processing is specifically as follows: assuming that x is an abscissa value of a missing point and represents a moment point of the missing point, and y is an ordinate value and represents a bandwidth of the missing point. $(x_1, y_1)$ is a time stamp and a bandwidth value of a first moment after the missing point (or abnormal value), $(x_0, y_0)$ is a time stamp and a bandwidth value of a first moment before the missing point (or abnormal value), and a formula $$y = \frac{x_1 - x}{x_1 - x_0} y_0 + \frac{x - x_0}{x_1 - x_0} y_1$$

may be used to obtain the bandwidth y of the missing point. After the interpolation processing, to enable a deep neural network model to converge quickly during training, normalization processing may be further performed on the historical bandwidth data. When normalization processing is performed, a maximum threshold (max) and a minimum threshold (min) need to be preset, and normalization processing is performed on the bandwidth data after interpolation processing by using a min-max standardization method. Assuming that a bandwidth value of the data to be processed is x, normalization processing is performed on bandwidth data x by using a formula $$y = \frac{x - \min}{\max - \min},$$

and a bandwidth value y of the data is obtained.

Step 603, filter the historical bandwidth data by using at least two low-pass filtering algorithms.

Step 604, perform a secondary processing on filtering results of all low-pass filtering algorithms to obtain filtered output bandwidth data.

Step 605, over-sample the historical bandwidth data and the filtered output bandwidth data.

Step 606, train the deep neural network model according to the over-sampled historical bandwidth data and the over-sampled filtered output bandwidth data.

Steps 603 to 606 are consistent with steps 502 to 505 in the third embodiment, and details are not described herein again.

After the deep neural network model is trained according to the over-sampled historical bandwidth data and the filtered output bandwidth data, the trained deep neural network model is deployed online for real-time filtering, and a method for using the trained deep neural network model for real-time filtering is consistent with steps 101 to 103 in the first embodiment, that is, initial bandwidth data of a server is obtained in real time, the initial bandwidth data is input into the deep neural network model trained in advance, and an output result of the deep neural network model is taken as the filtered output bandwidth data. Details are not described herein again.

In this embodiment, the obtained historical bandwidth data is pre-processed. In this way, the missing data of the historical bandwidth data can be filled to ensure the integrity of the historical bandwidth data and avoid the impact of the missing data on the accuracy of the model training; and pre-processing the historical bandwidth data can also enable the deep neural network model to converge quickly in the training process and reduce the time required for the training.

Figure 7:
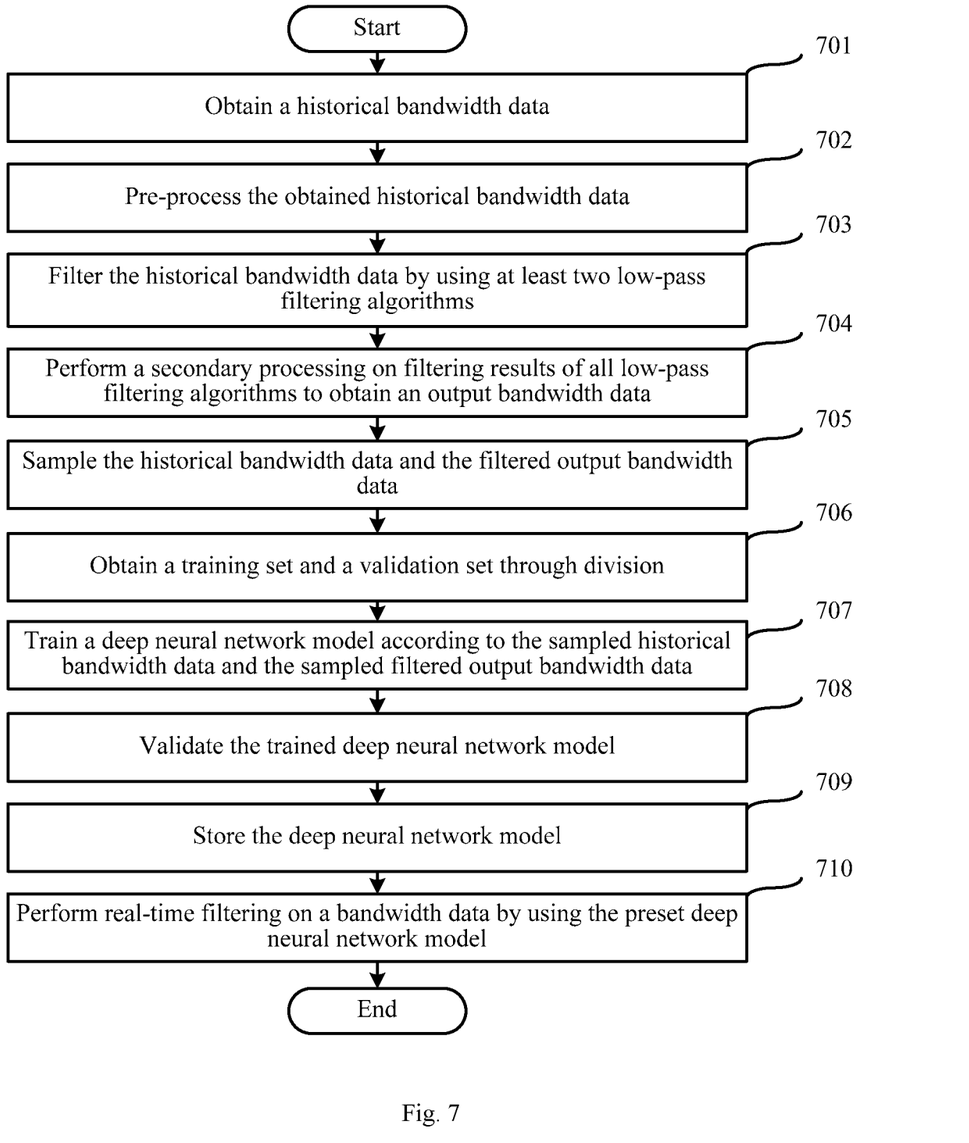
FIG. 7 is a flowchart of a method for bandwidth filtering based on deep learning according to the fourth embodiment of the present disclosure.

The following is a complete illustration of the process of training the deep neural network model and deploying the trained deep neural network model online for real-time filtering, and the specific process is shown in FIG. 7.

Step 701, obtain a historical bandwidth data.

Step 702, pre-process the obtained historical bandwidth data.

Step 703, filter the historical bandwidth data by using at least two low-pass filtering algorithms.

Step 704, perform a secondary processing on filtering results of all low-pass filtering algorithms to obtain filtered output bandwidth data.

Step 705, over-sample the historical bandwidth data and the filtered output bandwidth data.

Step 706, obtain a training set and a validation set through division.

Step 707, train a deep neural network model according to the over-sampled historical bandwidth data and the over-sampled filtered output bandwidth data.

Step 708, validate the trained deep neural network model.

Step 709, store the deep neural network model.

Step 710, perform real-time filtering on the bandwidth data by using the deep neural network model.

Step division of the foregoing methods is merely for clear description, and the steps may be combined into one step or some steps may be divided into a plurality of steps during implementation. Steps including a same logic relationship all fall within the protection scope of the present disclosure. Any unnecessary modification added in the algorithm or process or unnecessary design introduced without changing the core design of the algorithm and process falls within the protection scope of the present disclosure.

Figure 8:
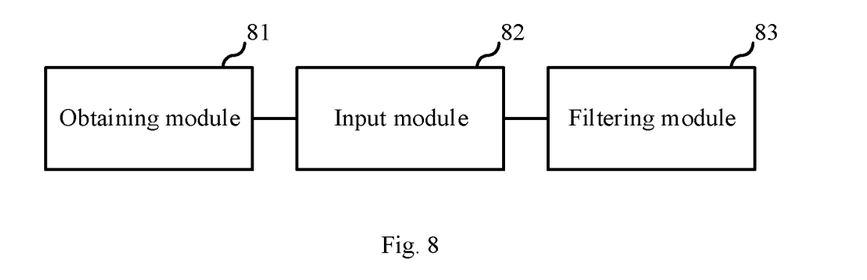
FIG. 8 is a schematic structural diagram of an apparatus for bandwidth filtering based on deep learning according to a fifth embodiment of the present disclosure.

A fifth embodiment of the present disclosure relates to an apparatus for bandwidth filtering based on deep learning, as shown in FIG. 8, including: an obtaining module 81, an input module 82, and a filtering module 83. The obtaining module 81 is configured to obtain initial bandwidth data of a server in real time. The input module 82 is configured to input the initial bandwidth data into a deep neural network model, where the deep neural network model is obtained through training according to historical bandwidth data and output bandwidth data obtained after filtering the historical bandwidth data. The filtering module 83 is configured to take an output result of the deep neural network model as filtered output bandwidth data.

In this embodiment, online real-time filtering can be made by using a preset deep neural network model, and learning can be made according to real-time changes of online bandwidth data, so that investment of a large quantity of manpower can be avoided, and consumption of time and energy can be reduced, thereby reducing a latency caused by filtering. On the other hand, when the deep neural network model is trained to have good accuracy, the trained deep neural network model may be deployed online for real-time filtering, which has a good filtering effect on the bandwidth data of the server.

It is not difficult to find that this embodiment is a apparatus embodiment corresponding to the first embodiment, and this embodiment can be implemented in cooperation with the first embodiment. The relevant technical details mentioned in the first embodiment are still valid in this embodiment, and details are not described herein again to reduce repetition. Correspondingly, the relevant technical details mentioned in this embodiment may also be applied to the first embodiment.

It is worth mentioning that all the modules involved in this embodiment are logical modules. In practical application, a logical unit may be a physical unit or a part of a physical unit, or be further implemented by using a combination of a plurality of physical units. In addition, to highlight the innovation part of the present disclosure, units not closely related to resolving the technical problems presented in the present disclosure are not introduced in this embodiment, but this does not mean that there are no other units in this embodiment.

In addition, the apparatus for bandwidth filtering based on deep learning further includes a processing module, and the processing module is configured to filter the historical bandwidth data by using at least two low-pass filtering algorithms to obtain filtering results of all low-pass filtering algorithms, and perform a secondary processing on the filtering results of all the low-pass filtering algorithms to obtain the output bandwidth data after filtering the historical bandwidth data.

In addition, the processing module is further configured to preset proportionality coefficients corresponding to the filtering results of all the filtering algorithms, and fuse the filtering results of all the low-pass filtering algorithms according to the proportionality coefficients.

In addition, the apparatus further includes a sampling module, and the sampling module is configured to over-sample the historical bandwidth data and the output bandwidth data obtained after filtering the historical bandwidth data.

In addition, the sampling module is specifically configured to select a moment point of the historical bandwidth data or the filtered output bandwidth data that is to be over-sampled, determine an over-sampled bandwidth value of the selected moment point according to a bandwidth value of the selected moment point and a bandwidth value of a neighboring moment point of the selected moment point, and sample the historical bandwidth data or the filtered output bandwidth data after all moment points of the over-sampled historical bandwidth data or the over-sampled filtered output bandwidth data are selected.

In addition, when determining the over-sampled bandwidth value of the selected moment point, the sampling module is specifically configured to determine whether the selected moment point is a first moment point of the historical bandwidth data or the filtered output bandwidth data; randomly select a value between a bandwidth value of the first moment point and a bandwidth value of a next moment point of the first moment point as an over-sampled bandwidth value of the first moment point when the selected moment point is the first moment point; determine whether a difference between the bandwidth value of the selected moment point and a bandwidth value of a previous moment point of the moment point is greater than a preset threshold when the selected moment point is not the first moment point; randomly select a value between the bandwidth value of the selected moment point and the bandwidth value of the next moment point of the selected moment point as an over-sampled bandwidth value of the selected moment point when the difference is greater than the preset threshold; and randomly select a value between the bandwidth value of the selected moment point and the bandwidth value of the previous moment point of the selected moment point as the over-sampled bandwidth value of the selected moment point when the difference is less than or equal to the preset threshold.

In addition, the apparatus further includes a pre-processing module. The pre-processing module is configured to pre-process the obtained historical bandwidth data, and the pre-processing at least includes: interpolation processing or normalization processing.

In addition, the input module is specifically configured to input a bandwidth data with a preset duration into the deep neural network model.

In addition, the apparatus further includes a validation module, and the validation module is configured to validate a fitting effect of the trained deep neural network model.

Figure 9:
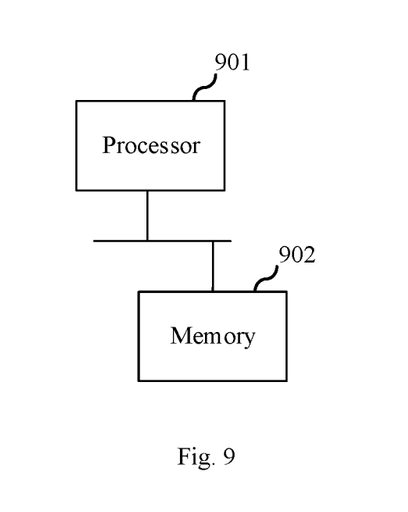
FIG. 9 is a schematic structural diagram of a server according to a sixth embodiment of the present disclosure.

A sixth embodiment of the present disclosure relates to a server, as shown in FIG. 9, including: at least one processor 901, and a memory 902 communicably connected with the at least one processor 901. The memory 902 stores an instruction executable by the at least one processor 901. The instruction, when executed by the at least one processor 901, causes the at least one processor 901 to perform the foregoing method for bandwidth filtering based on deep learning.

The memory 902 and the processor 901 are connected by a bus, the bus may include any quantity of interconnected buses and bridges, and the bus connects one or more processors 901 and various circuits of the memory 902. The bus may also connect various other circuits such as a peripheral device, a voltage regulator, and a power management circuit, and these are all known in this field, so that they are not further described herein. A bus interface provides an interface between the bus and a transceiver. The transceiver may be an element or a plurality of elements, for example, a plurality of receivers and transmitters, and provides a unit for communicating with various other devices on a transmission medium. Data processed by the processor is transmitted on a wireless medium by using an antenna, and the antenna further receives data and transmits the data to the processor 901.

The processor 901 is responsible for managing the bus and usual processing, and further provides various functions, including timing, peripheral interface, voltage regulation, power management and other control functions. The memory 902 may be configured to store data used by the processor 901 when performing operations.

A seventh embodiment of the present disclosure relates to a computer readable storage medium storing a computer program. The computer program, when executed by the processor, implements the foregoing method embodiments.

That is, a person skilled in the art may understand that all or some steps of the method of the foregoing embodiment can be implemented by a program instructing relevant hardware, and the program is stored in a storage medium, and includes a plurality of instructions to enable a device (which may be a single-chip microcomputer, a chip, or the like) or a processor to perform all or some steps of the method described in the embodiments of the present disclosure. The foregoing storage medium includes: any medium that can store program code, such as a USB flash disk, a removable hard disk, a read-only memory (ROM), a random access memory (RAM), a magnetic disk, or an optical disc.

A person of ordinary skill in the art may understand, the foregoing embodiments are specific implementations for implementing the present disclosure, and in practical application, various changes can be made in forms and details without departing from the spirit and scope of the present disclosure.

What is claimed is:

1. A method for bandwidth filtering based on deep learning, comprising:
    obtaining initial bandwidth data of a server in real time;
    inputting the initial bandwidth data into a deep neural network model, wherein the deep neural network model is obtained through training according to historical bandwidth data and output bandwidth data obtained after filtering the historical bandwidth data; and
    taking an output result of the deep neural network model as filtered output bandwidth data.

2. The method for bandwidth filtering based on deep learning according to claim 1, wherein obtaining the output bandwidth data after filtering the historical bandwidth data comprises:
    filtering the historical bandwidth data by using at least two low-pass filtering algorithms, to obtain filtering results of all low-pass filtering algorithms; and
    performing a secondary processing on the filtering results of all the low-pass filtering algorithms to obtain the output bandwidth data.

3. The method for bandwidth filtering based on deep learning according to claim 2, wherein performing a secondary processing on the filtering results of all the low-pass filtering algorithms comprises:
    presetting proportionality coefficients corresponding to the filtering results of all the filtering algorithms; and
    fusing the filtering results of all the low-pass filtering algorithms according to the proportionality coefficients.

4. The method for bandwidth filtering based on deep learning according to claim 2, wherein the secondary processing is a fusion processing comprising:
    pre-setting proportionality coefficients corresponding to the filtering results of all the low-pass filtering algorithms; and
    fusing the filtering results of all the low-pass filtering algorithms according to the proportionality coefficients.

5. The method for bandwidth filtering based on deep learning according to claim 1, wherein a method for training the deep neural network model comprises:
    over-sampling the historical bandwidth data and the output bandwidth data obtained after filtering the historical bandwidth data; and
    train the deep neural network model according to over-sampled historical bandwidth data and over-sampled filtered output bandwidth data.

6. The method for bandwidth filtering based on deep learning according to claim 5, wherein the over-sampling the historical bandwidth data and the output bandwidth data obtained after filtering the historical bandwidth data is specifically implemented by over-sampling the historical bandwidth data and the output bandwidth data obtained after filtering the historical bandwidth data by using an SMOTE algorithm.

7. The method for bandwidth filtering based on deep learning according to claim 1, after obtaining the historical bandwidth data, the method further comprising:
    pre-processing the historical bandwidth data, wherein the pre-processing at least comprises: interpolation processing or normalization processing; and
    filtering pre-processed historical bandwidth data to obtain the output bandwidth data.

8. The method for bandwidth filtering based on deep learning according to claim 1, after training the deep neural network model, the method further comprising:
    validating a fitting effect of the deep neural network model trained; and
    storing the deep neural network model when the fitting effect meets a preset requirement.

9. The method for bandwidth filtering based on deep learning according to claim 8, wherein after obtaining the historical bandwidth data and the output bandwidth data, the method comprises:
    dividing the historical bandwidth data and the output bandwidth data according to a preset duration;
    taking divided historical bandwidth data and divided output bandwidth data as a sample set;
    dividing the sample set into a training set and a validation set according to a preset proportion;
    wherein the training set is configured to train the deep neural network model, and the validation set is configured to validate the deep neural network model trained.

10. The method for bandwidth filtering based on deep learning according to claim 1, wherein the initial bandwidth data of the server is obtained by the server itself, or by a node server, or by a layer of intelligent virtual network, CDN, constituted by node servers placed throughout the network between a service provider and a consumer;
    wherein a CDN system is configured to monitor a bandwidth of a server and formulate a rate-limiting policy according to a real-time bandwidth.

11. The method for bandwidth filtering based on deep learning according to claim 1, wherein the deep neural network model comprises:
    an input layer, configured to receive the historical bandwidth data;
    an output layer, configured to output fitted data, wherein the fitted data has a same sequence length as that of the historical bandwidth data received by the input layer;
    a LSTM layer, being a long short-term memory network that processes bandwidth data of a relatively long time sequence.

12. The method for bandwidth filtering based on deep learning according to claim 1, wherein bandwidth data of the server is obtained from a data storage platform at a fixed frequency;
    and the bandwidth data obtained comprises bandwidth data of different servers.

13. The method for bandwidth filtering based on deep learning according to claim 1, wherein training the deep neural network model according to the historical bandwidth data and the output bandwidth data comprises:
- dividing the historical bandwidth data according to a preset time step parameter, to obtain an input data;
- inputting the input data into the deep neural network model;
- obtaining an output data determined by a LSTM layer included in the deep neural network model;
- wherein the output data has a same time sequence length as that of the input data.

14. A server, comprising:
at least one processor; and
a memory communicably connected with the at least one processor; wherein
the memory stores an instruction executable by the at least one processor; the instruction, when executed by the at least one processor, causes the at least one processor to perform a method for bandwidth filtering based on deep learning;
wherein the method comprises:
- obtaining initial bandwidth data of a server in real time;
- inputting the initial bandwidth data into a deep neural network model, wherein the deep neural network model is obtained through training according to historical bandwidth data and output bandwidth data obtained after filtering the historical bandwidth data; and
- taking an output result of the deep neural network model as filtered output bandwidth data.

15. The server according to claim 14, wherein obtaining the output bandwidth data after filtering the historical bandwidth data comprises:
- filtering the historical bandwidth data by using at least two low-pass filtering algorithms, to obtain filtering results of all low-pass filtering algorithms; and
- performing a secondary processing on the filtering results of all the low-pass filtering algorithms to obtain the output bandwidth data.

16. The server according to claim 15, wherein performing a secondary processing on the filtering results of all the low-pass filtering algorithms comprises:
- presetting proportionality coefficients corresponding to the filtering results of all the filtering algorithms; and
- fusing the filtering results of all the low-pass filtering algorithms according to the proportionality coefficients.

17. The server according to claim 14, wherein a method for training the deep neural network model comprises:
- over-sampling the historical bandwidth data and the output bandwidth data obtained after filtering the historical bandwidth data by using an SMOTE algorithm; and
- train the deep neural network model according to over-sampled historical bandwidth data and over-sampled filtered output bandwidth data.

18. The server according to claim 14, wherein after obtaining the historical bandwidth data, the method further comprising:
- pre-processing the historical bandwidth data, wherein the pre-processing at least comprises: interpolation processing or normalization processing; and
- filtering pre-processed historical bandwidth data to obtain the output bandwidth data.

19. The server according to claim 14, wherein after training the deep neural network model, the method further comprising:
- validating a fitting effect of the deep neural network model trained; and
- storing the deep neural network model when the fitting effect meets a preset requirement.

20. A non-transitory computer readable storage medium storing a computer program, wherein the computer program, when executed by a processor, implements a method for bandwidth filtering based on deep learning;
wherein the method comprises:
- obtaining initial bandwidth data of a server in real time;
- inputting the initial bandwidth data into a deep neural network model, wherein the deep neural network model is obtained through training according to historical bandwidth data and output bandwidth data obtained after filtering the historical bandwidth data; and
- taking an output result of the deep neural network model as filtered output bandwidth data.

* * * * *